US012694284B2

(12) United States Patent
Sarkar et al.

(10) Patent No.: US 12,694,284 B2
(45) Date of Patent: Jul. 28, 2026

(54) NODE, AND METHOD PERFORMED THEREBY, FOR PREDICTING A BEHAVIOR OF USERS OF A COMMUNICATIONS NETWORK

(71) Applicant: Telefonaktiebolaget LM Ericsson (publ), Stockholm (SE)

(72) Inventors: Abhishek Sarkar, Bengaluru (IN); Kaushik Dey, Kolkata (IN); Dhiraj Nagaraja Hegde, Bengalore (IN); Ashis Kumar Roy, Durgapur (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1437 days.

(21) Appl. No.: 17/354,617

(22) PCT Filed: Dec. 29, 2018

(86) PCT No.: PCT/IN2018/050892
§ 371 (c)(1),
(2) Date: Jun. 22, 2021

(87) PCT Pub. No.: WO2020/136663
PCT Pub. Date: Jul. 2, 2020

(65) Prior Publication Data
US 2024/0104365 A1      Mar. 28, 2024

(51) Int. Cl.
*G06N 3/08* (2023.01)
*G06N 5/022* (2023.01)
*G06Q 30/0202* (2023.01)

(52) U.S. Cl.
CPC ............... *G06N 3/08* (2013.01); *G06N 5/022* (2013.01); *G06Q 30/0202* (2013.01)

(58) Field of Classification Search
CPC ...... G06N 5/022; G06N 3/08; G06Q 30/0202; G01N 27/20; G01N 17/006
See application file for complete search history.

(56) References Cited

U.S. PATENT DOCUMENTS 11,887,003 B1 *   1/2024   Bopardikar ............ G06N 20/00
2006/0112050 A1 *   5/2006   Miikkulainen ........ G16H 50/20
                                                                706/46

(Continued)

FOREIGN PATENT DOCUMENTS

WO      WO 2002/010961 A2      2/2002

OTHER PUBLICATIONS

Communication Regarding European Search Report and European Search Opinion for European Patent Application No. 18944970.5 dated Aug. 25, 2022.

(Continued)

*Primary Examiner* — Haimei Jiang
*Assistant Examiner* — Evel Honore
(74) *Attorney, Agent, or Firm* — Sage Patent Group

(57)      ABSTRACT

A method performed by a node for predicting a behavior of users of a communications network is described. The node manages an artificial neural network. The node merges a first pre-existing predictive model of the behavior in a first group of users with a second model of the behavior in a second group of users. The merging comprises establishing connections between the first model and the second model. Each of the connections has a respective weight. The respective weights of the connections are learned by respective connections of neurons in the artificial neural network based on data from a third group of users. The node also obtains a third model for predicting the behavior in the third group of users, based on the merged models and the data from the third group of users.

18 Claims, 6 Drawing Sheets

(56) References Cited

U.S. PATENT DOCUMENTS

| | | | |
|---|---|---|---|
| 2015/0310336 A1 | 10/2015 | Sotela et al. | |
| 2016/0189048 A1* | 6/2016 | Chang | G06F 18/2135 |
| | | | 706/12 |
| 2017/0262445 A1* | 9/2017 | Jeon | H04L 67/306 |
| 2018/0078843 A1 | 3/2018 | Bao | |
| 2018/0277224 A1* | 9/2018 | Shirota | G11C 7/1048 |
| 2019/0026374 A1* | 1/2019 | Liu | G06Q 30/0202 |
| 2019/0026761 A1* | 1/2019 | Jain | G06F 16/2465 |
| 2019/0147356 A1* | 5/2019 | Peng | G06N 3/088 |
| | | | 706/21 |
| 2019/0156200 A1* | 5/2019 | Hu | G06N 3/045 |
| 2019/0228176 A1* | 7/2019 | Fishbeck | H04L 9/0816 |
| 2019/0228477 A1* | 7/2019 | Carter | G01W 1/10 |
| 2019/0244115 A1* | 8/2019 | Tang | G06N 5/02 |
| 2019/0384911 A1* | 12/2019 | Caspi | G06N 20/00 |
| 2020/0106856 A1* | 4/2020 | Megahed | G06F 16/24578 |
| 2020/0184494 A1* | 6/2020 | Joseph | G06F 18/214 |
| 2021/0022034 A1* | 1/2021 | Zachrison | H04W 72/52 |
| 2021/0319352 A1* | 10/2021 | Maly | G06N 20/00 |
| 2022/0329554 A1* | 10/2022 | Patel | H04W 8/18 |
| 2023/0165349 A1* | 6/2023 | Song | A45C 13/1069 |
| | | | 455/575.1 |

OTHER PUBLICATIONS

Prashanth et al., "High Accuracy Predictive Modelling for Customer Churn Prediction in Telecom Industry," International Conference on Machine Learning and Data Mining in Pattern Recognition (MLDM 2017), Springer, Part of the Lecture Notes in Computer Science book series (LNAI,vol. 10358) 2017, pp. 391-402.

Liu et al., "Ensemble Transfer Learning Algorithm," IEEE Access, vol. 6, Feb. 14, 2018, pp. 2389-2396.

International Search Report and Written Opinion of the International Searching Authority, PCT/IN2018/050892, mailed Mar. 26, 2019, 7 pages.

* cited by examiner a)

NODE, AND METHOD PERFORMED THEREBY, FOR PREDICTING A BEHAVIOR OF USERS OF A COMMUNICATIONS NETWORK

CROSS REFERENCE TO RELATED APPLICATIONS

This application is a 35 U.S.C. § 371 national stage application of PCT International Application No. PCT/IN2018/050892 filed on Dec. 29, 2018, the disclosure and content of which is incorporated by reference herein in its entirety.

TECHNICAL FIELD

The present disclosure relates generally to a node and methods performed thereby for predicting a behavior of users of a communications network. The present disclosure further relates generally to a computer program product, comprising instructions to carry out the actions described herein, as performed by the node. The computer program product may be stored on a computer-readable storage medium.

BACKGROUND

Computer systems in a communications network may comprise one or more nodes, which may also be referred to simply as nodes. A node may comprise one or more processors which, together with computer program code may perform different functions and actions, a memory, a receiving and a sending port. A node may be, for example, a router.

Machine Learning (ML) models may be considered useful tools to address a variety of problems, such as churn, upsell/cross sell or any other situations where customer behavior and psychographic profile behavior may be considered relevant input to a problem domain. In order to obtain a performing model with a high level of prediction accuracy, enough data may be required to train, validate and then test the models. With the advent of deep learning and its application for complex problems, the need for training data has multiplied, and large amounts of data may be required to achieve the expected level of accuracy.

To obtain such large amount data may be often challenging, given the data transfer limitations, cost or even the availability of data. If a product has been introduced recently, then data available on the same may be limited and hence building models with existing methods becomes impossible.

SUMMARY

It is an object of embodiments herein to improve the predictability of a behavior of users of a communications network.

According to a first aspect of embodiments herein, the object is achieved by a method, performed by a node. The method is for predicting a behavior of users of a communications network. The node manages an artificial neural network. The node merges a first pre-existing predictive model of the behavior in a first group of users with a second pre-existing predictive model of the behavior in a second group of users. The merging comprises establishing one or more connections between the first pre-existing predictive model and the second pre-existing predictive model. Each of the one or more connections has a respective weight. The respective weights of the one or more connections are learned by respective connections of neurons in the artificial neural network based on data obtained from a third group of users. The node also obtains a third predictive model of the behavior for predicting the behavior in the third group of users, based on the merged pre-existing predictive models and the data obtained from the third group of users.

According to a second aspect of embodiments herein, the object is achieved by node. The node is further configured to merge the first pre-existing predictive model of the behavior in the first group of users with the second pre-existing predictive model of the behavior in the second group of users. To merge is configured to comprise establishing one or more connections between the first pre-existing predictive model and the second pre-existing predictive model. Each of the one or more connections is configured to have the respective weight. The respective weights of the one or more connections are configured to be learned by respective connections of neurons in the artificial neural network based on data configured to be obtained from a third group of users. The node is also configured to obtain the third predictive model of the behavior for predicting the behavior in the third group of users, based on the pre-existing predictive models configured to be merged and the data configured to be obtained from the third group of users.

According to a third aspect of embodiments herein, the object is achieved by a computer program, comprising instructions which, when executed on at least one processor, cause the at least one processor to carry out the method performed by the node.

According to a fourth aspect of embodiments herein, the object is achieved by a computer-readable storage medium, having stored thereon the computer program, comprising instructions which, when executed on at least one processor, cause the at least one processor to carry out the method performed by the node.

By the node merging the first pre-existing predictive model of the behavior with the second pre-existing predictive model of the behavior in the second group of users, the node may be enabled to obtain the third predictive model of the behavior for predicting the behavior in the third group of users even if only limited data may be available from the third group of users. Embodiments herein may be understood to enable that such a prediction model may be achieved with considerably fewer data while obtaining the desired level of accuracy. Moreover predictive models according to embodiments herein may be understood to be more economical to develop and maintain for an organization, and therefore more desirable. By the node merging the first pre-existing predictive model of the behavior with the second pre-existing predictive model of the behavior in the second group of users, the node may be enabled to introduce connections even at lower layers between the pre-existing predictive models, which may be understood to enable the newer, third predictive model to use the features at whatever level of complexity that may be needed for the new problem to be solved. That is, to improve the predictive power of the third predictive model.

BRIEF DESCRIPTION OF THE DRAWINGS

Examples of embodiments herein are described in more detail with reference to the accompanying drawings, according to the following description.

3

Figure 2:
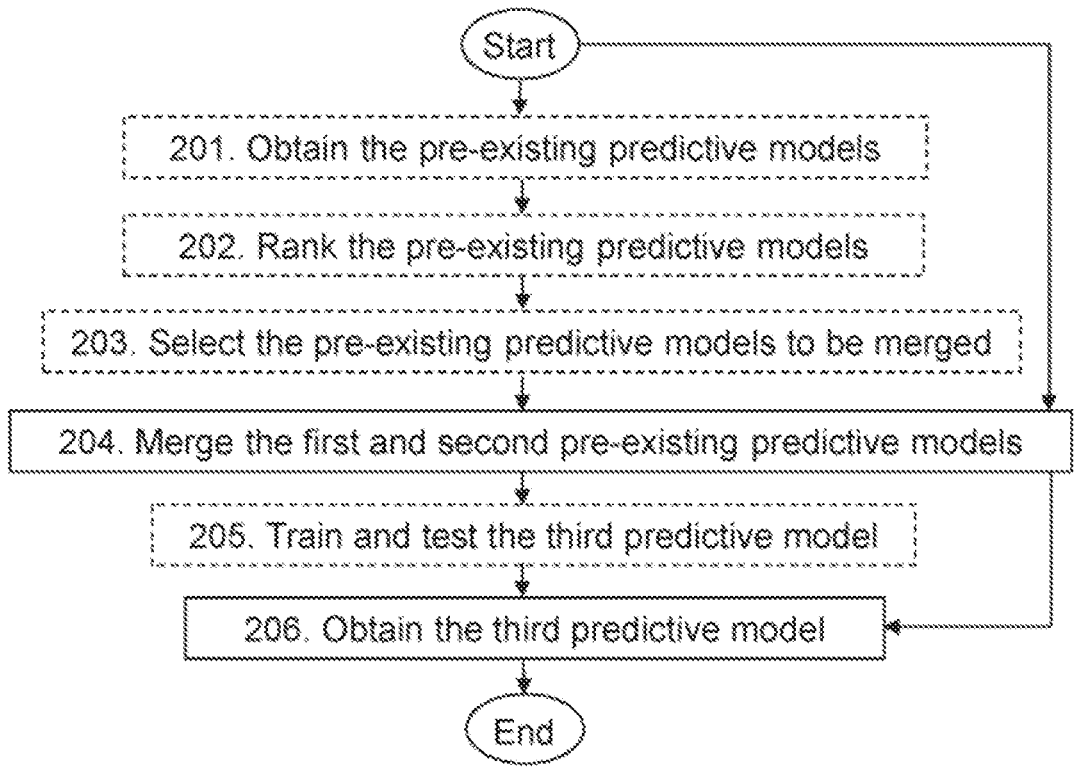

FIG. 2 is a flowchart depicting a method in a node, according to embodiments herein.

Figure 3:
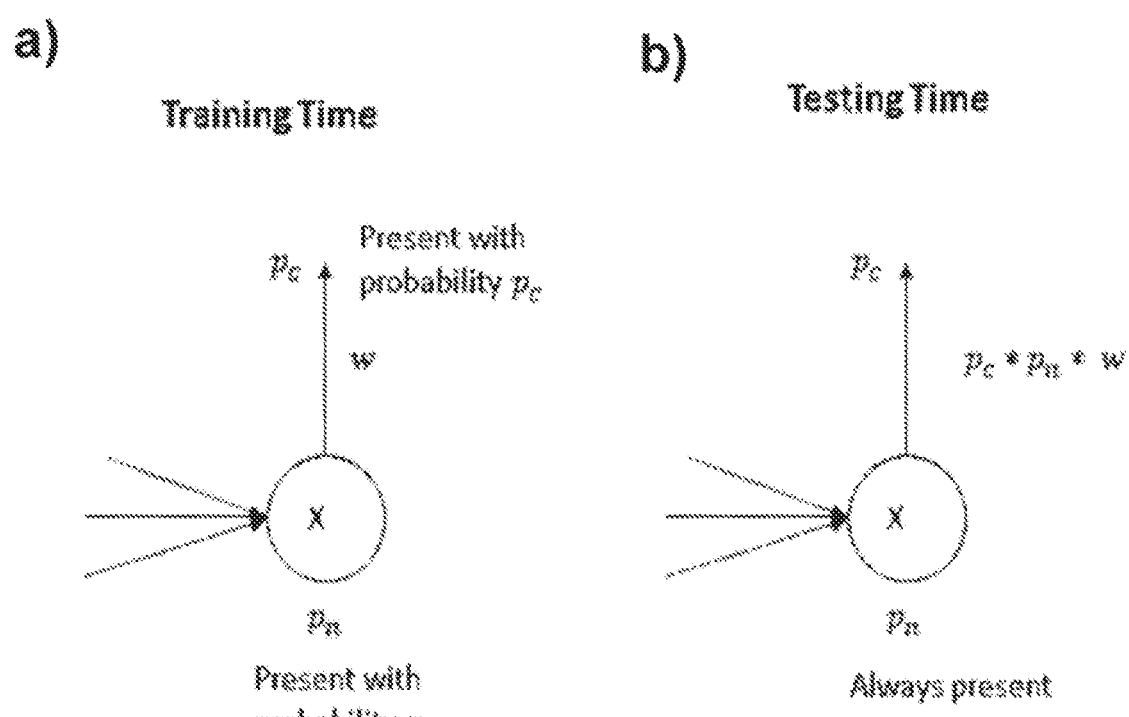

FIG. 3 is a schematic diagram depicting aspects of the method performed by the node, according to embodiments herein.

Figure 4:
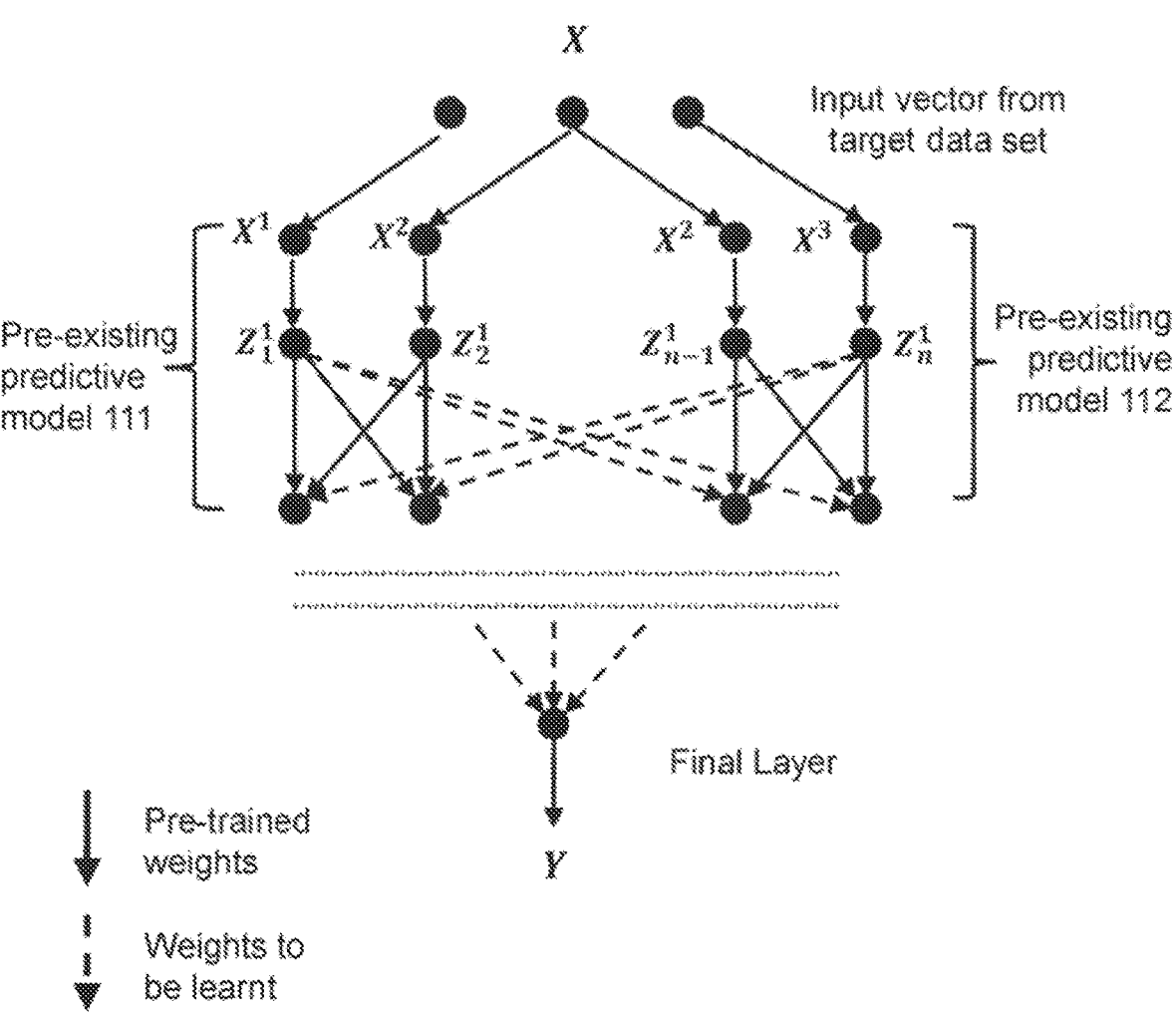

FIG. 4 is a schematic diagram depicting other aspects of the method performed by the node, according to embodiments herein.

Figure 5:
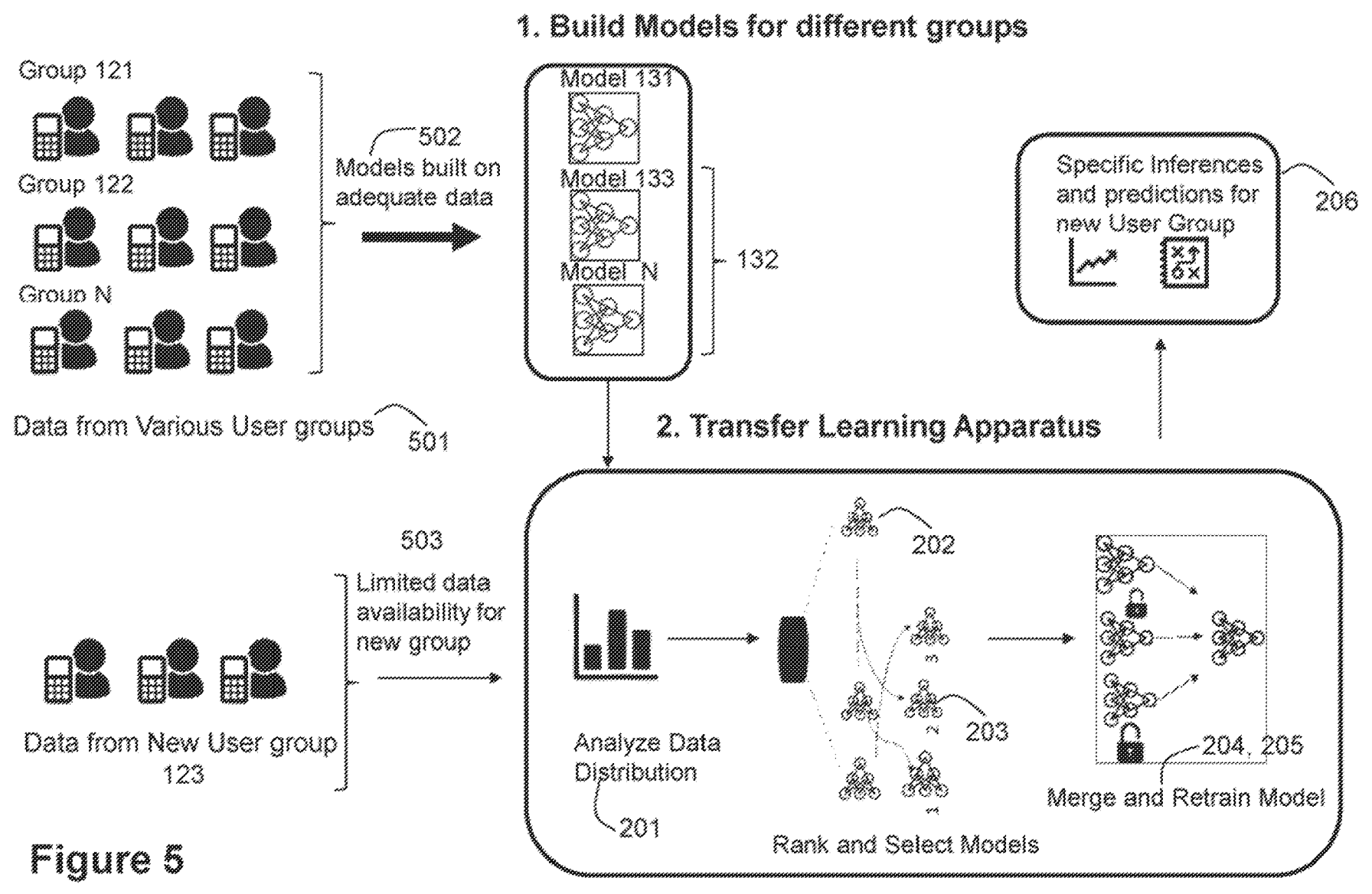

FIG. 5 is a schematic diagram of the method performed by the node, according to embodiments herein.

Figure 6:
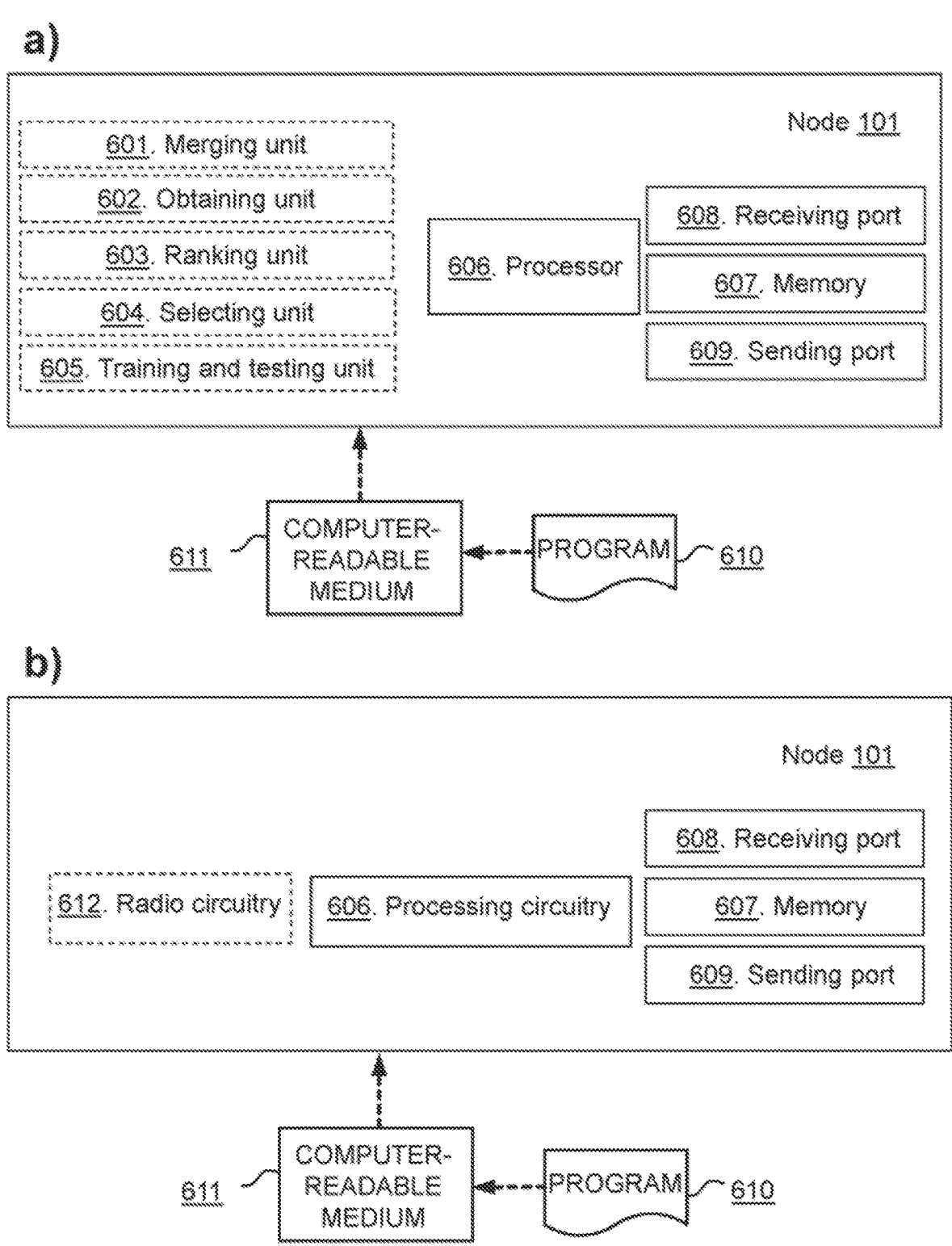

FIG. 6 is a schematic block diagram illustrating embodiments of a node, according to embodiments herein.

DETAILED DESCRIPTION

As stated earlier, usage of ML to obtain accurate predictive models of behavior with existing methods becomes impossible when the size of the input data is not big enough.

There may be a lot in common in the behavior of subjects across different geographies or product segments. For example, customer behavioral patterns seen in one geography may be applicable to another geography. These behavioral patterns may not always be recognized when the data set is limited. The lack of such sufficient and timely data, which may not always be available due to various data limitations, stymie the performance of certain behavioral prediction models.

Certain aspects of the present disclosure and their embodiments may provide solutions to the challenges discussed earlier. There are, proposed herein, various embodiments which address one or more of the issues disclosed herein.

Embodiments herein may be understood to be drawn to a method enabling to obtain predictive models in situations of limited data availability, such as post immediate network implementations or situations with data pipe limitations preventing transfer of large amount of data. By using the embodiments described herein, the models obtained may have comparable accuracy to those that could be obtained with larger pools of data.

As summarized overview, embodiments herein may be understood to be drawn to obtaining behavioral analytics models which may be, for example, particularly applicable in the telecommunications industry, such as churn prediction, upsell and cross sell in a geography/demography where limited data may be available by leveraging our past learnings from different geography/demography.

In this document, the challenges of the existing methods with respect to the prediction of behavioural variables, as well as the solutions provided by embodiments herein is illustrated with the example of churn, with the particular aim at churn prevention. It may, however, be understood that the principles and methods may be applicable for any other customer analytics problems with behavioral or psychographic inputs, or even to problems where the nature and distribution of data may be non-sequential and may not change frequently over time.

Churn is a well-established problem in the telecommunications world. There are various and unique algorithms to detect and address churn. Churn prediction is, in practice, not solved by a single model, because of differences in the nature of the product/service offered, geographical differences, different time periods, etc. One or more churn models may typically have to be developed for each region. Even though there may be differences in the nature of churn in these different situations, there may be still a lot in common between these models. Embodiments herein may be understood to make use of what may be common between different churn models to obtain and/or enrich a new churn prediction model. Embodiments herein may be understood to enable that such a prediction model may be achieved with considerably fewer data while obtaining the desired level of accuracy. Moreover predictive models according to embodiments herein may be understood to be more economical to develop and maintain for an organization, and therefore more desirable.

According to the foregoing, embodiments herein may be understood to relate to methods and apparatus for developing behavioral analytics models with knowledge from other demographics and regions. Embodiments herein may make use of Deep Neural Networks (DNN) to leverage the learnings from one or more past implementations, where data may have been sufficient to obtain a predictive model of sufficient accuracy. One or more such models which may have been trained earlier for other geographics may be selected based on the similarity to a current prediction problem, e.g., churn prediction problem. These DNN models may be combined by introducing connections between the pre-trained models which may be learnt on the new data. Each layer of a DNN may be expected to combine raw inputs to form complex features. By introducing connections from various layers, the complex features may be used in the new model. Hence, churn prediction may be enabled to be achieved with available techniques.

The idea of 'merging' two neural networks for transfer learning has not been considered previously. Previous approaches involved using a pre-trained model and then only learnt the final layer. These previous approaches assume that the basic features which may have been created in the initial layers are the same for both the old problem and the new problem. They assume that it is sufficient to have only the final layer, which combines the basic features to make the final decision that may need to be changed. However, this may not be always applicable, as to solve the new problem, changes in the basic features may need to be made as well.

Several embodiments and examples are comprised herein. It should be noted that the embodiments and/or examples herein are not mutually exclusive. Components from one embodiment or example may be tacitly assumed to be present in another embodiment or example and it will be obvious to a person skilled in the art how those components may be used in the other exemplary embodiments and/or examples.

Figure 1:
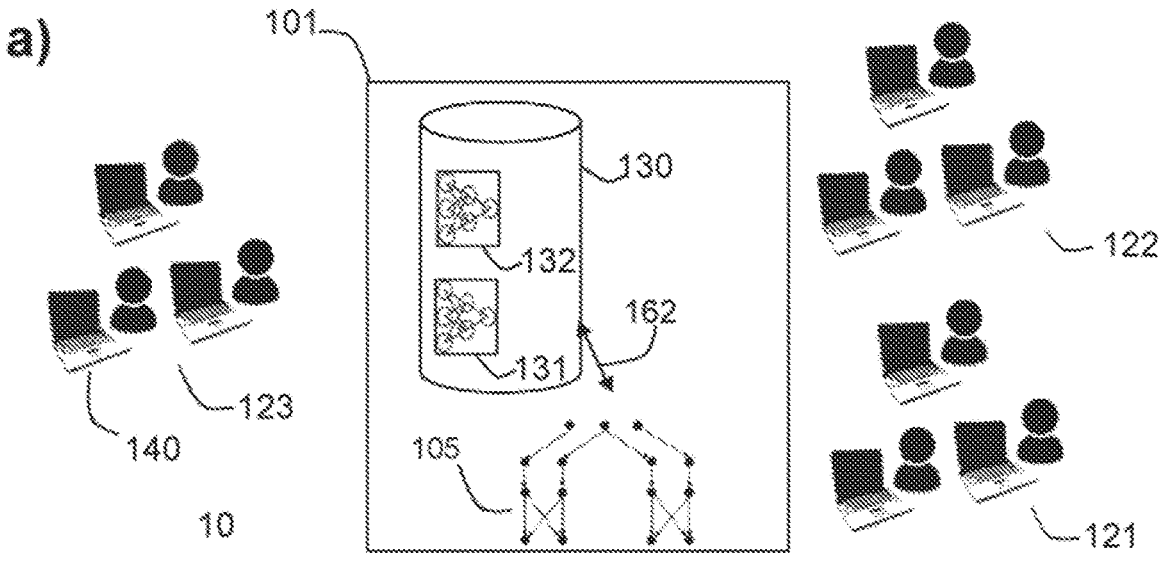
FIG. 1 is a schematic diagram illustrating a non-limiting example of a communications network, according to embodiments herein.

FIG. 1 depicts two non-limiting examples, in panels "a" and "b", respectively, of a communications network 10, in which embodiments herein may be implemented. In some example implementations, such as that depicted in the non-limiting example of FIG. 1*a*), the communications network 10 may be a computer network. In other example implementations, such as that depicted in the non-limiting example of FIG. 1*b*), the communications network 10 may be implemented in a telecommunications network 100, sometimes also referred to as a cellular radio system, cellular network or wireless communications system. In some examples, the telecommunications network 100 may comprise network nodes which may serve receiving nodes, such as wireless devices, with serving beams.

In some examples, the telecommunications network 100 may for example be a network such as 5G system, or Next Gen network or an Internet service provider (ISP)-oriented network that may support an SCEF. The telecommunications network 100 may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), or any cellular network or system.

The communications network 10 comprises a plurality of nodes, whereof a node 101 is depicted in FIG. 1. The node 101 may be understood as a computer system or server, which may have the capability to predicting a behavior of users of the communications network 10. Particularly, the node 101 may be understood to have a capability to manage an artificial neural network 105. The artificial neural network 105 may be understood as a machine learning framework, which may comprise a collection of connected nodes, where in each node or perceptron there may be an elementary decision unit. Each such node may have one or more inputs and an output. The input to a node may be from the output of another node or from a data source. Each of the nodes and connections may have certain weights or parameters associated with it. In order to solve a decision task, the weights may be learnt or optimized aver a data set which may be representative of the decision task. The most commonly used node, may have each input separately weighted, and the sum may be passed through a non-linear function which may be known as an activation function. The nature of the connections and the node may determine the type of the neural network, for example a feedforward network, recurrent neural network etc. To have a capability to manage an artificial neural network 105 may be understood herein as having the capability to store the training data set and the models that may result from the machine learning, to train a new model, and once the model may have been trained, to use this model for prediction. In some embodiments, the system that may be used for training the model and the one used for prediction may be different. The system used for training the model may require more computational resources than the one to use the built/trained model to make predictions. Therefore, the node 101 may, for example, support running python/Java with Tensorflow or Pytorch, theano etc. . . . The node 101 may also have GPU capabilities.

In some examples, the node 101 may be implemented, as depicted in the non-limiting example of FIG. 1b), as a standalone server in e.g., a host computer in the cloud 110. The node 101 may in some examples be a distributed node or distributed server, with some of its respective functions being implemented locally, e.g., by a client manager, and some of its functions implemented in the cloud 110, by a server manager. Yet in other examples, the node 101 may also be implemented as processing resource in a server farm. The node 101 may be under the ownership or control of a service provider, or may be operated by the service provider or on behalf of the service provider.

The communications network 10 has users, e.g., subscribers, which may be grouped in groups, based on certain characteristics such as period of time when they were users, past users, new users, gender, age group, occupation, etc. . . . In some particular examples, the communications network 10 may have a first group of users 121, a second group of users 122, and a third group of users 123. However, it may be understood that these number of groups is for the purpose of facilitating the explanation of the embodiments herein, and that more groups may be comprised in the communications network 10. In other examples, the third group of users 123 may be users of the communications network 10, whereas any or both of the first group of users 121 and the second group of users 122 may be users of one or more other networks.

The first node 101 may have access to a memory or a database 130, depicted on FIG. 1b), which may comprise pre-existing predictive models of behavior of users, e.g., of the communications network 10, or of another network. The memory or database 130 may alternatively be comprised in the first node 101 itself. In particular, the memory or database 130 may comprise a first pre-existing predictive model 131 of the behavior in a first group of users 121, and a second pre-existing predictive model 132 of the behavior in a second group of users 122. The memory or database 130 may comprise a plurality of second pre-existing predictive models of the behavior in a respective second group of users 122, the plurality comprising the second pre-existing predictive model 132. In FIG. 1, only the second pre-existing predictive model 132 is represented to simplify the Figure.

Any of the users in the first group of users 121, the second group of users 122 and the third group of users 123, may access the communications network 10, respectively, via a communication device 140, as depicted in the non-limiting example scenario of FIG. 1. The communications network 10 may also comprise other communication devices. The communication device 140 may be a UE or a Customer Premises Equipment (CPE) which may be understood to be enabled to communicate data, with another entity, such as a server, a laptop, a Machine-to-Machine (M2M) device, device equipped with a wireless interface, or any other radio network unit capable of communicating over a wired or radio link in a communications system such as the communications network 10. The communication device 140 may be also e.g., a mobile terminal, wireless terminal and/or mobile station, mobile telephone, cellular telephone, or laptop, just to mention some further examples. The communication device 140 may be, for example, portable, pocket-storable, hand-held, computer-comprised, a sensor, camera, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles or any other radio network unit capable of communicating over a wired or radio link in the communications network 10. The communication device 140 may be enabled to communicate wirelessly in the communications network 10. The communication may be performed e.g., via a RAN and possibly one or more core networks, comprised within the communications network 10.

The communications device 140 may access the network 10 via a network node 150, e.g., an access node, or radio network node, such as, for example, the radio network node, depicted in FIG. 1b). The telecommunications network 100 may cover a geographical area, which in some embodiments may be divided into cell areas, wherein each cell area may be served by a radio network node, although, one radio network node may serve one or several cells. The network node 150 may be e.g., a gNodeB. That is, a transmission point such as a radio base station, for example an eNodeB, or a Home Node B, a Home eNode B or any other network node capable to serve a wireless device, such as the communications device 140 in the communications network 10. The network node 150 may be of different classes, such as, e.g., macro eNodeB, home eNodeB or pico base station, based on transmission power and thereby also cell size. In some examples, the radio network node may serve receiving nodes with serving beams. The network node 150 may support one or several communication technologies, and its name may depend on the technology and terminology used. The network node 150 may be directly connected to one or more core networks in the telecommunications network 100.

The node 101 is configured to communicate within the communications network 10 with network node 150 over a first link 161, e.g., a radio link, an infrared link, or a wired link. The first link 161 may be comprised of a plurality of individual links. The node 101 is configured to communicate with the database 130 over a second link 162, e.g., a radio link, an infrared link, or a wired link. The second link 162 may be comprised of a plurality of individual links. Each of the users in any of the first group of users 121, the second group of users 122, and/or the third group of users 123 may be understood to communicate with the communications network 10 over a respective link, which is not depicted in FIG. 1 to simplify the Figure. Any of the respective links may access the communications network 10 via the network node 150.

Any of the first link 161, the second link 162 and any of the respective links may be a direct link or it may go via one or more computer systems or one or more core networks in the communications network 10, which are not depicted in FIG. 1, or it may go via an optional intermediate network. The intermediate network may be one of, or a combination of more than one of, a public, private or hosted network; the intermediate network, if any, may be a backbone network or the Internet; in particular, the intermediate network may comprise two or more sub-networks, which is not shown in FIG. 1.

In general, the usage of "first", "second", etc. herein may be understood to be an arbitrary way to denote different elements or entities, and may be understood to not confer a cumulative or chronological character to the nouns they modify.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Embodiments of a method, performed by the node 101, will now be described with reference to the flowchart depicted in FIG. 2. The method is for predicting a behavior of users of a communications network 10. The node 101 and the second network node 121 operate in the communications network 10. The node 101 manages the artificial neural network 105.

Several embodiments are comprised herein. In some embodiments all the actions may be performed. In some embodiments, one or more actions may be optional. In FIG.

2. optional actions are indicated with dashed lines. It should be noted that the examples herein are not mutually exclusive. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description. Some actions may be performed in a different order than that shown in FIG. 2.

Action 201

Embodiments herein may be understood to be drawn to a method enabling to predict a behavior of users of the communications network 10, such as the third group of users 123. The availability of data from the third group of users 123 may be understood to be limited, such as post immediate network implementations or situations with data pipe limitations preventing transfer of large amount of data, such that attempting to obtain a predictive model of any behavior of the third group of users 123 with data of the third group of users 123 alone may not be possible, or it may be inadequate to obtain a predictive model of any reliable accuracy.

In some embodiments, a size of the data that may have been obtained from the third group of users 123 may be smaller than that on which the first pre-existing predictive model 111 and the second pre-existing predictive model 112 are based on, by a configurable first threshold. A threshold may be understood as a value or a number. Configurable may be understood as that it may be changed, e.g., decided on a case by case, e.g., learning task by learning task, basis. As a non-limiting example, the size of the data that may be available from the third group of users 123 may be, e.g., less than 50% of the average size of the other data sets.

The first threshold may be based on a prediction accuracy of a predictive model of the behavior solely based on the data obtained from the third group of users 123. That is, if the prediction accuracy of the predictive model of the behavior that it may be possible to achieve solely based on the data obtained from the third group of users 123 is under the chosen first threshold, which may render it inadequate, then it may be desirable to implement the method described herein. The prediction accuracy may be measured, e.g., by a probability of error associated with the predictive model of the behavior. In practice, computation of the predictive model of the behavior solely based on the data obtained from the third group of users 123 may be understood to not be necessary, as the first threshold may be based on the probability of error that may be typically associated with the size of the data to be used. Prediction accuracy may be understood herein as a loss measure based on the difference between the true and predicted values. Such a measure may be any of, e.g., F-Score, Akaike Information Criterion (AIC), Bayesian Information Criterion (BIC), Classification accuracy, Area Under the Curve (AUC), Mean Absolute Percentage Error (MAPE), R-square etc.

As mentioned earlier, embodiments herein may be understood to leverage the learnings from one or more past implementations, where data may have been sufficient to obtain a predictive model of sufficient accuracy. One or more such models may have been trained earlier for other geographies, or in other time periods, within the communications network 10, or within other communications networks. The node 101 may have access to a large repository of behavior prediction models that may have been built for various regions, various time periods, and various products. The repository may be comprised in the memory or database 130.

In order to eventually predict the behavior, e.g., churn, of the third group of users 123 with sufficient accuracy, in this Action 201, the node 101 may obtain the first pre-existing predictive model 131 of the behavior, and the second pre-existing predictive model 132, or the plurality of second pre-existing predictive models 132 of the behavior. The obtaining in this Action 201 may be understood as collecting, retrieving, or receiving, e.g., from the database 130, for example via the first link 161. However, the obtaining in this Action 201 may comprise receiving from another node in either the communications network 10 or in another network. In some examples, the first node 101 may have even itself calculated the first pre-existing predictive model 131 of the behavior, and the second pre-existing predictive model 132, or the plurality of second pre-existing predictive models 132 of the behavior.

A predictive model may be understood as a mathematical model or function that aims at best fit a set of data, such that inputting observed data, it may output predicted or estimated data with a certain level of accuracy. In some embodiments, at least one of the pre-existing predictive models may be a deep neural network model.

A deep neural network model may be understood, in general terms, to use more than three layers.

In some particular embodiments, at least one of the pre-existing predictive models may be a deep feed forward neural network, that is, a neural network where the connections do not form a cycle.

The behavior may for example be churn in the telecommunications network 100.

According to embodiments herein, a heuristic approach may be followed to choose from the pre-existing predictive models that may be available, for a particular learning task. A measure may be created to gauge the importance of a pre-existing predictive model with respect to a learning task, as follows. The node 101 may, in this Action 201, obtain the first pre-existing predictive model 131 of the behavior, and the second pre-existing predictive model 132, or the plurality of second pre-existing predictive models 132 of the behavior, based on one or more of the following fourth options.

In a first option, the obtaining may be based on one or more features common to a respective pre-existing predictive model, from the first pre-existing predictive model 131 and the plurality of second pre-existing predictive models 132, and a learning task associated with the behavior of the third group of users 123. In other words, common features between the pre-existing predictive model and the learning task. A learning task may be understood a learning patterns or rules from data, to be applied to solve a particular task. The nature of the rules may vary from machine learning algorithm used to the nature of the task being solved. A feature may be understood as a raw variable from the data, or it may also be understood as a function of one or variables present in the data set, wherein the function may be created. For example, if the behavior is churn, a learning task may be to predict whether a subscriber will churn or not based on his/her historical data, and features may be simple raw variables such as, age, gender, income etc. A more complex feature may be e.g., the ratio of average monthly mobile bill of the subscriber to his income.

Respective pre-existing predictive model may be understood to mean that a comparison may be performed between the learning task and each of the first pre-existing predictive model 131 and the plurality of second pre-existing predictive models 132, one by one. Herein, in general, respective may be understood as referring to when considered separately, one by one, or particular.

In a second option, the obtaining may be based on a respective predictive power, based on the one or more features, in the respective pre-existing predictive model. The predictive power may be measured for example, e.g., F-Score, Classification accuracy, AUC, lift, or R-square. The predictive power may be understood as an indication of the importance of the common features for prediction in the pre-existing predictive model. It may be understood that if a feature has a high predictive power of the behavior in a pre-existing predictive model, it may have a higher likelihood of also having a high predictive power in predicting the behavior for the third group of users 123.

In a third option, the obtaining may be based on, a degree of similarity between a respective first profile of data corresponding to a respective pre-existing group of users, from the first group of users 121 and the second groups of users 122, and a respective second profile of the data obtained from the third group of users 123. In other words, the obtaining may be based on the similarity between the profile of the training data set, the source data, on which the model may have been built, compared with the profile of the training data set, that is, the target data. A profile may be understood herein as a set of statistics that may characterize the data. For example, mean, standard deviation, etc of a particular variable may be representative of the distribution of the variable, to a certain extent. The degree of similarity between two data sets that may be measured by defining a similarity measure/distance measure with the help of the common attributes/variables present in the data sets. In terms of distance or similarity measure Euclidean distance, Hamming distance, Gower's similarity measure etc. may be used.

In a fourth option, the obtaining may be based on, a performance of a respective pre-existing predictive model with the data obtained from the third group of users 123. A performance may be understood herein as a prediction accuracy of a model in terms of the measures such as: Precision, Recall, True Positive Rate (TPR), True Negative Rate (TNR), Receiver Operating Characteristic (ROC), Area Under the curve (AUC), etc. This may be understood to mean that under the fourth option, the pre-existing predictive models may be run with the data from the third group of users 123, and an examination may be made on how well they may be able to predict the behavior of the third group of users 123.

As mentioned earlier, embodiments herein may leverage the learnings from one or more pre-existing predictive models, where data may have been sufficient to obtain a predictive model of sufficient accuracy. These pre-existing predictive models may be combined, or merged, as will be described later, by introducing connections between the pre-trained models which may be learnt on the new data in subsequent Actions. By performing this Action 201, the node 101 may be enabled to obtain a short-list of pre-existing predictive models, that may have a high likelihood of assisting the node 101 predict the behavior of the third group of users 123.

Action 202

Next, the node 101 may create an importance score of a particular pre-existing predictive model for a particular learning task at hand based on the importance of common features to the pre-existing predictive model and the profile of the training data set, also referred to as source data, on which the model may have been built and the profile of the training data set, that is, the target data for the current model, that is, a third predictive model of the behavior for predicting the behavior in the third group of users 123. Based on this score, the first node 101 may then create a short list of models to be considered for transfer learning, according to the Actions that will be described subsequently in Action 204, Action 205 and Action 206.

In this Action 202, the node 101 may rank the pre-existing predictive models to be merged according to a selection criterion, and the learning task associated with the behavior of the third group of users 123. The ranking criterion may be based on one or more of: the one or more features common to the respective pre-existing predictive model and the learning task associated with the behavior of the third group of users 123; ii) the respective predictive power, based on the one or more features, in the respective pre-existing predictive model: iii) the degree of similarity between the respective first profile of data corresponding to the respective pre-existing group of users, and the respective second profile of the data obtained from the third group of users 123; and iv) the performance of the respective pre-existing predictive model with the data obtained from the third group of users 123. Expressed differently, various pre-existing predictive models may be ranked based on the similarity of the source data to the target data to consider them as candidates for transfer learning.

Ranking may be understood as e.g., sorting.

Action 203

In this Action 203, the node 101 may select the pre-existing predictive models to be merged from a pool of pre-existing predictive models. The selecting 203 may be performed according to a selection criterion, the selection criterion being based on the ranking criterion and a second threshold. In some particular embodiments, the selection criterion may be the same as the ranking criterion.

In embodiments wherein Action 202 may have been performed, the pool of pre-existing predictive models may be the pre-existing predictive models with a highest rank, based on the second threshold. The second threshold may be a second value, or a second number, and it may also be chosen on a case by case basis. In examples wherein the ranked pre-existing predictive models may be many and they may have high predictive powers, the second threshold may be higher than if the number of pre-existing predictive models is small and their respective predictive power may be lower, and/or dispersed. For example, there may be only, e.g., 2 pre-existing predictive models that may be considered acceptable and therefore selected in this Action, instead of 20 to choose from.

By selecting the pre-existing predictive models to be merged from the pool of pre-existing predictive models in this Action 203, the node 101 may be enabled to combine the best pre-existing predictive models in the next Action, and therefore increase the predictive power of the third predictive model of the behavior, for predicting the behavior in the third group of users 123.

Action 204

The artificial neural network 105 may be understood to comprise a group of so-called "neurons", which may have so-called "connections" among them. A neuron herein may be understood as a unit of computation. A neuron may have one or more inputs and an output. Each input to the neuron may be associated with a weight or connection. The sum of the product of the inputs with its corresponding weight may be passed through an activation function such as Rectified Linear Unit (ReLU), tanh, Leaky ReLU etc, softmax etc. These activation functions may be understood to add non-linearity to the network. At each layer, a connection may determine which input may be fed to which neuron. And the weight associated with the connection may determine how important that input is for the computation of the connected neuron.

In this Action 204, the node 101 merges the first pre-existing predictive model 111 of the behavior in the first group of users 121 with the second pre-existing predictive model 112 of the behavior in a second group of users 122. The merging 204 comprises establishing one or more connections between the first pre-existing predictive model 111 and the second pre-existing predictive model 112. Each of the one or more connections has a respective weight. The respective weights of the one or more connections are learned by respective connections of neurons in the artificial neural network 105 based on the data obtained from the third group of users 123.

As the size of the data obtained from the third group of users 123, that is, the target data set, may be judged to be small or very limited, the weights of the pre-existing predictive models may be kept the same, and only the weights of the new connections may be learnt.

For example, the pre-existing predictive models may be Deep Neural Network (DNN) models. After having selected in Action 203 the short listed models in Action 202, the pre-existing DNN models may be 'merged'. That is, connections may be introduced between the shortlisted pre-existing predictive models. The weights of these connections may be learnt on the data obtained from the third group of users 123, which may be understood as the target data, namely the data that may be aimed to be predicted.

In some embodiments, the merging 204 in this Action 204 may further comprise merging the first pre-existing predictive model 111 of the behavior with the plurality of second pre-existing predictive models 112 of the behavior in the respective second groups of users 122. That is, more than two pre-existing predictive models may be merged. The merging 204 in such embodiments may be understood to comprise establishing the one or more connections between the first pre-existing predictive model 111 and each of the second pre-existing predictive models 112 in the plurality, each of the one or more connections having a respective weight. The respective weights of the one or more connections may have been learned by respective connections of neurons in the artificial neural network 105 based on the data obtained from the third group of users 123.

The idea of 'merging' two neural networks for transfer learning has not been considered previously. Previous approaches involved using a pre-trained model and then only learnt the final layer. A layer in an artificial neural network such as the artificial neural network 105 may be understood as comprising nodes, and usually a particular layer may be made of the same kind of nodes. Each node may be understood as a unit of computation, comprising some inputs and an output. A node may comprise of a set of inputs, each associated with a set of weights/connections. A weighted sum of these inputs may be obtained, and this sum may then be passed through an activation function such as ReLU, Softmax, tanh, leaky ReLU etc. Since each layer of the artificial neural network 105 may be understood to introduce more complexity into the features created, by merging the first pre-existing predictive model 111 of the behavior with the plurality of second pre-existing predictive models 112 of the behavior in respective second groups of users 122 in this Action 204, the node 101 may be enabled to introduce connections even at the lower layers, which may be understood to enable the newer model to use the features at whatever level of complexity that may be needed for the new problem to be solved, that is, to improve the predictive power of the third predictive model. Furthermore, the limited data that may be available from the third group of users 123 may be compensated for, and the behavior in the new group predicted, with higher accuracy and a shorter time.

Action 205

In this Action 205, the node 101 may train and test the third predictive model of the behavior. The training and testing in this Action 205 may comprise at least one of: a) learning a set of weights of a first set of layers of the artificial neural network 105, and freezing a second set of layers of the artificial neural network 105, wherein the second set of layers comprises lower layers to the first set of layers, wherein the second set of layers are based on pre-existing connections in the pre-existing predictive models, and wherein the first set of layers refrain from using pre-existing connections, or b) using different learning rates in the first set of layers and the second set of layers in the artificial neural network 105 during training, based on a probability of dropout of nodes comprised, respectively, within the first set of layers and the second set of layers in the artificial neural network 105.

The first set of layers may be understood to be the final layers of the merged network. The second set of layers may be considered "lower layers". To freeze the lower layers of the network may be understood to comprise to exclude from training, or to use a very low-learning rate, so that to encourage differential learning rates across initial-middle and final layers in order to avoid catastrophic forgetting, probabilistically dropping nodes and connections between nodes in the artificial neural network 10 during training, based on a parameter denoted by dropout-probability in order to achieve reduction in generalization error. Catastrophic forgetting may be understood as erasing previously learnt knowledge during learning of new, disjoint knowledge. To probabilistically drop nodes may be understood as referring to the fact that during training of the network, every node may be understood to be present in the network with a certain probability, and for every batch of training, a set of nodes may be sampled and taken out the network.

Learning rate may be understood as a parameter which may determine how quickly or slowly the weights of the network may be changed with each batch of training. The higher the learning rate is, the higher the change in the weights may be understood to be. Learning rate may be defined in the context of optimization and minimizing the loss function of the neural network. Derivatives of the loss function may be obtained with respect to the weights of the neural network, e.g., by means of back propagation. Then the derivative multiplied by the learning rate may then be subtracted from the current weight of the connections. Thus, if the learning rate is higher, the rate of change of the weights may be understood to also be higher.

In some embodiments herein, a new kind of dropout may be used. To dropout may be understood to refer to dropping out nodes, hidden as well as input, in an artificial neural network, such as the artificial neural network 105. This may be understood to bring about regularization thus reducing overfitting. Regularization may be understood as limiting the complexity of the model or keeping a restriction on how large and/or complex the model will be. This may also be viewed as taking an ensemble of the various subnetworks within in the artificial neural network 105. The dropout that may be used in examples of embodiments herein may involve not just dropping nodes, but also connections. The first node 101 may probabilistically decide whether a particular connection and node should be present or not during training. During testing, similarly to the traditional dropout, the first node 101 may keep all the nodes and connections, but multiply the weight of the connections with the probability of being present during training that may be associated with the connection and the probability of the node of being present during training, from which the connection may spring. This new dropout whereby instead of just dropping nodes probabilistically, both nodes and connections maybe dropped probabilistically may bring more richness in the ensemble, hence better reduction of overfitting.

In some embodiments, the training and testing in this Action 205 may further comprise training and testing a subset of pre-existing connections in the pre-existing predictive models by initializing the pre-existing connections in the subset with previously learned weights. To initialize may be understood as to assign certain weights at the beginning of training to the connections. There may be various strategies to initialize the weights, using the weights from another network may be similar to transferring the learning from that network to a new network such as the communications network 10.

In other words, embodiments herein enable to leverage pre-existing weights and use a subset of connections, which may be understood to correspond to the final layers, thereby enabling the training to be effectively completed on a more limited amount of data than may have been required without the above framework, while retaining the knowledge that may have been gained in previous models at coarse grained level, but refining the finer nuances of the knowledge by learning principally the final layers in order to achieve a desired prediction accuracy using limited data and thereby reduced computational expense and/or power.

If, for example, the data obtained from the third group of users 123, that is the target data set, though limited may be moderate in size, then, the pre-existing connections may also be learnt. This may be accomplished by initializing them with the weights that may have been previously learnt. The learning rate for the pre-existing connections may then be kept much smaller. The rationale behind it may be understood to be to make use of learnt feature spaces. Once such shared weights may be used, the learning may be understood to be faster and less expensive. Hence, equivalent or even better accuracy may be achieved using a much smaller dataset. The same may be understood to alleviate challenges in a situation wherein the availability of the data obtained from the third group of users 123 may be small.

Having different learning rates for pre-trained connections and for new connections, e.g., lower learning rate for pre-trained connections and higher learning rate for new connections, may enable the first node 101 to make use of previous learnings to make new learnings. By using lower learning rates for older connections, the previously learnt weights may not need to change a lot, and also catastrophe forgetting may be prevented. By having higher learning rates for newer connections new things may be learned that may be particular to the new data set, that is, the data obtained from the third group of users 123.

Action 206

In this Action 206, the node 101 obtains the third predictive model of the behavior for predicting the behavior in the third group of users 123, based on the merged pre-existing predictive models and the data obtained from the third group of users 123.

In embodiments wherein, e.g., all Actions may be performed by the node 101, obtaining may be understood as determining or calculating the third model that may then be used to predict the behavior. The third predictive model of the behavior may therefore be based, in some embodiments on the third predictive model of the behavior, as trained and tested in Action 205.

In some embodiments wherein Action 205 may not be performed by the node 101, for example, because another node may perform the training and testing in a distributed environment, the third predictive model obtained in this Action 206 may be more preliminary, and only based on the merged pre-existing predictive models and the data obtained from the third group of users 123. The node 101 may then provide or send the obtained third predictive model to other node, e.g., in the communications network 10, for training and testing.

The third predictive model of the behavior may then be obtained, based on the merged pre-existing predictive models further comprising the plurality of second pre-existing predictive models 112.

By obtaining the third predictive model in this Action 206, the node 101 may be enabled to predict the behavior of the third group of users 123 in situations wherein the availability of the data from this third group of users 123 may be limited. That is in situations wherein it would be otherwise impossible to obtain a predictive model with a reliable level of accuracy. The level of accuracy of the third predictive model that may be obtain in this Action 206 may understood to be comparable to that that could be obtained with large pools of data.

FIG. 3 is a schematic illustration depicting an example of the training, in panel a) and the testing, in panel b) according to Action 205. As depicted in FIG. 3 a), during the training phase, indicated as "training time", the first node 101 may train the third predictive model of the behavior with a first node "X" in the artificial neural network 105. The first node "X", may be present in the third predictive model during the training phase with a probability $p_a$. The probability $p_a$ may be understood as the probability that a node is present during training. Its connection to second node in the artificial neural network 105 may have a probability $p_c$ and an associated output w. The probability $p_c$ may be understood as the probability that the connection may be present during training and the output w of the node during testing. As depicted in FIG. 3 b), during the testing phase, indicated as "testing time", the output of each node may be multiplied with the probability of the node being present $p_c$ and the probability of the connection being present.

FIG. 4 is a schematic illustration of the merging of the first pre-existing predictive model 111 with the second pre-existing predictive model 112, according to Action 204. In FIG. 4, X denotes the input vector, and Y denotes the output of the final layer. The first pre-existing predictive model 111 comprises a subset of the input vector depicted as $X^1$, which is fed to a node in a layer depicted as $Z_1^1$, another subset of the input vector depicted as $X^2$, and fed to another input node in layer 1, depicted as $Z_2^1$. The second pre-existing predictive model 112 comprises the same subset of the input vector $X^2$, fed to a node in layer 1, depicted as $Z_{n-1}^1$, another subset of the input vector, depicted as $X^2$, fed to an input node in layer 1, depicted as $Z_n^1$. The previously learned weights, or pre-trained weights from the pre-existing predictive models, are depicted in solid arrows. Dashed arrows represent the one or more connections between the first pre-existing predictive model 131 and the second pre-existing predictive model 132, established in Action 204, wherein the respective weights of the one or more connections that are learned by the respective connections of the neurons in the artificial neural network 105 based on data obtained from the third group of users 123.

FIG. 5 is a schematic illustration of the method according to embodiments herein. At 501, data from various user groups may be collected. The various user groups in this example comprise the first group of users 121, a first second group of users 122, and a second second group of users N. At 502, the first pre-existing predictive model 131 of the behavior, and the plurality of second pre-existing predictive models 132 of the behavior in the respective second groups of users 122, and N are built, by the first node 101, or by another node. The second pre-existing predictive model 133 models the behavior of the first second group of users 122, and model N models the behavior of the second second group of users. At 501, data from a new user group, the third group of users 123, is obtained, which may have limited availability. The first node 101, referred to in FIG. 5 as a "Transfer learning apparatus", in Action 201, then obtains the first pre-existing predictive model 131 of the behavior, and the plurality of second pre-existing predictive models 132 of the behavior in the respective second groups of users 122, and N, based on the one or more features, the respective predictive power, the degree of similarity of the profiles of data, and/or the performance of the pre-existing predictive models with the data obtained from the third group of users 123. This may involve, among others, analysing data distributions, as depicted in the Figure. The first node 101 then ranks the models, in accordance with Action 202, and selects the models, in accordance with Action 203. At 204, the first node 101 merges the pre-existing predictive models establishing the one or more connections between the first pre-existing predictive model 131 and each of the second pre-existing predictive models 132 in the plurality. Each of the one or more connections have a respective weight, wherein the respective weights of the one or more connections have been learned by respective connections of neurons in the artificial neural network 105 based on the data obtained from the third group of users 123. In accordance with Action 205, the first node 101 then trains and tests the third predictive model of the behavior. Finally, at Action 206, the third predictive model is obtained, and specific inferences and predictions for the third group of users 123 may be performed.

Certain embodiments may provide one or more of the following technical advantage(s). Embodiments herein enable to build prediction models of a behavior, such as e.g., churn, when the available data is limited. For example, when a new subscription plan is introduced or if a service has been launched in a new region for which a large amount of churn data is currently not available. By making use of pre-existing predictive models, which may have a lot in common with the current behavior prediction problem, as our starting point, the limited data may be compensated for, and the behavior in the new group predicted.

FIG. 6 depicts two different examples in panels a) and b), respectively, of the arrangement that the node 101 may comprise to perform the method actions described above in relation to FIG. 2. In some embodiments, the node 101 may comprise the following. arrangement depicted in FIG. 6*a*. The node 101 is configured to manage the artificial neural network 105. The node 101 may be understood to be for predicting a behavior of users of a communications network 10.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the node 101, and will thus not be repeated here. For example, at least one of the pre-existing predictive models may be configured to be a deep neural network model. In FIG. 6, optional modules are indicated with dashed boxes.

The node 101 is configured to, e.g. by means of a merging unit 601 within the node 101 configured to, merge the first pre-existing predictive model 131 of the behavior in the first group of users 121 with the second pre-existing predictive model 133 of the behavior in a second group of users 122. To merge is configured to comprise establishing the one or more connections between the first pre-existing predictive model 131 and the second pre-existing predictive model 133. Each of the one or more connections are configured to have the respective weight. The respective weights of the one or more connections are configured to be learned by the respective connections of neurons in the artificial neural network 105 based on data configured to be obtained from the third group of users 123.

The node 101 is configured to, e.g. by means of an obtaining unit 602 within the node 101 configured to, obtain the third predictive model of the behavior for predicting the behavior in the third group of users 123, based on the pre-existing predictive models configured to be merged and the data configured to be obtained from the third group of users 123.

In some embodiments, the behavior may be configured to be churn in the telecommunications network 100.

In some embodiments, the size of the data configured to be obtained from the third group of users 123 may be smaller than that on which the first pre-existing predictive model 131 and the second pre-existing predictive model 133 may be configured to be based on, by the configurable first threshold.

The first threshold may be configured to he based on the prediction accuracy of the predictive model of the behavior configured to be solely based on the data configured to be obtained from the third group of users 123.

In some embodiments, to merge may be further configured to comprise merging the first pre-existing predictive model 131 of the behavior with the plurality of second pre-existing predictive models 132 of the behavior in the respective second groups of users 122. To merge may be further configured to comprise establishing the one or more connections between the first pre-existing predictive model 131 and each of the second pre-existing predictive models 132 in the plurality. Each of the one or more connections has the respective weight. The respective weights of the one or more connections may be configured to have been learned by the respective connections of neurons in the artificial neural network 105 based on data configured to be obtained from the third group of users 123. The third predictive model of the behavior may be configured to be obtained based on the pre-existing predictive models configured to be merged, further comprising the plurality of second pre-existing predictive models 132.

The node 101 may be further configured to, e.g. by means of the obtaining unit 602 within the node 101 configured to, obtain the first pre-existing predictive model 131 of the behavior and the plurality of second pre-existing predictive models 132 of the behavior based on one or more of: i) the one or more features common to the respective pre-existing predictive model, from the first pre-existing predictive model 131 and the plurality of second pre-existing predictive models 132, and the learning task configured to be associated with the behavior of the third group of users 123; ii) the respective predictive power, based on the one or more features, in the respective pre-existing predictive model; iii) the degree of similarity between the respective first profile of data corresponding to the respective pre-existing group of users, from the first group of users 121 and the second groups of users 122, and the respective second profile of the data obtained from the third group of users 123; and iv) the performance of the respective pre-existing predictive model with the data configured to be obtained from the third group of users 123.

In some embodiments, the node 101 may be further configured to, e.g. by means of a ranking unit 603 within the node 101 configured to, rank the pre-existing predictive models configured to be merged according to the selection criterion, and the learning task configured to be associated with the behavior of the third group of users 123. The ranking criterion may be configured to be based on one or more of: i) the one or more features common to the respective pre-existing predictive model and the learning task associated with the behavior of the third group of users 123: ii) the respective predictive power, based on the one or more features, in the respective pre-existing predictive model; iii) the degree of similarity between the respective first profile of data corresponding to the respective pre-existing group of users, and the respective second profile of the data obtained from the third group of users 123; and iv) the performance of the respective pre-existing predictive model with the data configured to be obtained from the third group of users 123.

In some embodiments, the node 101 may be further configured to, e.g. by means of a selecting unit 604 within the node 101 configured to, select the pre-existing predictive models to be merged from the pool of pre-existing predictive models. To select may be configured to be performed according to the selection criterion. The selection criterion may be configured to be based on the ranking criterion and the second threshold.

In some embodiments, the node 101 may be configured to, e.g. by means of a training and testing unit 605 within the node 101 configured to, train and test the third predictive model of the behavior. To train and test may be configured to comprise at least one of: a) learning the set of weights of the first set of layers of the artificial neural network 105, and freezing the second set of layers of the artificial neural network 105. The second set of layers may be configured to comprise lower layers to the first set of layers. The second set of layers may be configured to be based on the pre-existing connections in the pre-existing predictive models. The first set of layers may be configured to refrain from using the pre-existing connections, or b) using different learning rates in the first set of layers and the second set of layers in the artificial neural network 105 during training, based on the probability of dropout of nodes configured to be comprised, respectively, within the first set of layers and the second set of layers in the artificial neural network 105.

In some embodiments, to train and test may be further configured to comprise training and testing the subset of pre-existing connections in the pre-existing predictive models by initializing the pre-existing connections in the subset with previously learned weights Other modules may be comprised in the node 101.

The embodiments herein in the node 101 may be implemented through one or more processors, such as a processor 606 in the node 101 depicted in FIG. 6*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the node 101. One such carrier may be in the form of a CD ROM disc. It is however feasible with other data carriers such as a memory stick. The computer program code may furthermore be provided as pure program code on a server and downloaded to the node 101.

The node 101 may further comprise a memory 607 comprising one or more memory units. The memory 607 is arranged to be used to store obtained information, store data, configurations, schedulings, and applications etc. to perform the methods herein when being executed in the node 101.

In some embodiments, the node 101 may receive information from, e.g., the one or more third network nodes 130, through a receiving port 608. In some embodiments, the receiving port 608 may be, for example, connected to one or more antennas in node 101. In other embodiments, the node 101 may receive information from another structure in the communications network 10 through the receiving port 608. Since the receiving port 608 may be in communication with the processor 606, the receiving port 608 may then send the received information to the processor 606. The receiving port 608 may also be configured to receive other information.

The processor 606 in the node 101 may be further configured to transmit or send information to e.g., the one or more third network nodes 130, or another structure in the communications network 10, through a sending port 609, which may be in communication with the processor 606, and the memory 607.

Those skilled in the art will also appreciate that the merging unit 601, the obtaining unit 602, the ranking unit 603, the selecting unit 604 and the training and testing unit 605, described above may refer to a combination of analog and digital modules, and/or one or more processors configured with software and/or firmware, e.g., stored in memory, that, when executed by the one or more processors such as the processor 606, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, any of the units 601-605 described above may be respectively implemented as the processor 606 of the node 101, or an application running on such processor.

Thus, the methods according to the embodiments described herein for the node 101 may be respectively implemented by means of a computer program 610 product, comprising instructions, i.e., software code portions, which, when executed on at least one processor 606, cause the at least one processor 606 to carry out the actions described herein. as performed by the node 101. The computer program 610 product may be stored on a computer-readable storage medium 611. The computer-readable storage medium 611, having stored thereon the computer program 610, may comprise instructions which, when executed on at least one processor 606, cause the at least one processor 606 to carry out the actions described herein, as performed by the node 101. In some embodiments, the computer-readable storage medium 611 may be a non-transitory computer-readable storage medium, such as a CD ROM disc, or a memory stick. In other embodiments, the computer program 610 product may be stored on a carrier containing the computer program 610 just described, wherein the carrier is one of an electronic signal, optical signal, radio signal, or the computer-readable storage medium 611, as described above.

The node 101 may comprise an interface unit to facilitate communications between the node 101 and other nodes or devices, e.g., the node 101, or any of the other nodes. In some particular examples, the interface may, for example, include a transceiver configured to transmit and receive radio signals over an air interface in accordance with a suitable standard.

In other embodiments, the node 101 may comprise the following arrangement depicted in FIG. 6*b*. The node 101 may comprise a processing circuitry 606, e.g., one or more processors such as the processor 606, in the node 101 and the memory 607. The node 101 may also comprise a radio circuitry 613, which may comprise e.g., the receiving port 608 and the sending port 609. The processing circuitry 606 may be configured to, of operable to, perform the method actions according to FIG. 2, and/or FIG. 5, in a similar manner as that described in relation to FIG. 6*a*. The radio circuitry 613 may be configured to set up and maintain at least a wireless connection any of the other nodes in the communications network 10. Circuitry may be understood herein as a hardware component.

Hence, embodiments herein also relate to the node 101 operative to manage the artificial neural network 105. The node 101 may be operative to operate in the communications network 10. The node 101 may comprise the processing circuitry 606 and the memory 607, said memory 607 containing instructions executable by said processing circuitry 606, whereby the node 101 is further operative to perform the actions described herein in relation to the node 101, e.g., in FIG. 2, and/or FIG. 5.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

The invention claimed is:

1. A method performed by a node for predicting a behavior of users of a communications network, the node managing an artificial neural network, the method comprising:

obtaining a first pre-existing predictive neural network model of the behavior in a first group of users and a second pre-existing predictive neural network model of the behavior in a second group of users from a database, generating a third predictive neural network model based on merging the first pre-existing predictive neural network model of the behavior in the first group of users with the second pre-existing predictive neural network model of the behavior in the second group of users, the merging comprising establishing one or more connections between neurons in the first pre-existing predictive neural network model and the second pre-existing predictive neural network model, each of the one or more connections having a respective weight, wherein the respective weights of the one or more connections are learned by respective connections of neurons in the artificial neural network based on data obtained from a third group of users, and training the third predictive neural network model of the behavior for predicting the behavior in the third group of users based on the data obtained from the third group of users, wherein a memory size of the data obtained from the third group of users is smaller than that on which the first pre-existing predictive neural network model and the second pre-existing predictive neural network model are based on, by a configurable first threshold.

2. The method according to claim 1, wherein the first threshold is based on a prediction accuracy of a predictive neural network model of the behavior solely based on the data obtained from the third group of users.

3. The method according to claim 1, wherein the merging further comprises merging the first pre-existing predictive neural network model of the behavior with a plurality of second pre-existing predictive neural network models of the behavior in respective second groups of users, the merging comprising establishing the one or more connections between the first pre-existing predictive neural network model and each of the second pre-existing predictive neural network models in the plurality, each of the one or more connections having a respective weight, wherein the respective weights of the one or more connections have been learned by respective connections of neurons in the artificial neural network based on the data obtained from the third group of users, and wherein the third predictive neural network model of the behavior is generated based on the merged pre-existing predictive neural network models further comprising the plurality of second pre-existing predictive neural network models.

4. The method according to claim 3, wherein obtaining the first pre- existing predictive neural network model of the behavior and the plurality of second pre-existing predictive neural network models of the behavior is based on one or more of:

one or more features common to a respective pre-existing predictive neural network model from the first pre-existing predictive neural network model and the plurality of second pre-existing predictive neural network models, and a learning task associated with the behavior of the third group of users;

a respective predictive power, based on the one or more features, in the respective pre-existing predictive neural network model;

a degree of similarity between a respective first profile of data corresponding to a respective pre-existing group of users, from the first group of users and the second groups of users, and a respective second profile of the data obtained from the third group of users; and a performance of a respective pre-existing predictive neural network model with the data obtained from the third group of users.

5. The method according to claim 4, wherein the method further comprises:

ranking the pre-existing predictive neural network models to be merged according to a ranking criterion, and the learning task associated with the behavior of the third group of users, the ranking criterion being based on one or more of:

the one or more features common to the respective pre-existing predictive neural network model and the learning task associated with the behavior of the third group of users;

the respective predictive power, based on the one or more features, in the respective pre-existing predictive neural network model;

the degree of similarity between the respective first profile of data corresponding to the respective pre-existing group of users, and the respective second profile of the data obtained from the third group of users; and the performance of the respective pre-existing predictive neural network model with the data obtained from the third group of users.

6. The method according to claim 5, wherein the method further comprises:

selecting the pre-existing predictive neural network models to be merged from a pool of pre-existing predictive neural network models, the selecting being performed according to a selection criterion, the selection criterion being based on the ranking criterion and a second threshold.

7. The method according to claim 1, further comprising:

testing the third predictive neural network model of the behavior, wherein the training and testing comprising at least one of:

learning a set of weights of a first set of layers of the artificial neural network, and freezing a second set of layers of the artificial neural network, wherein the second set of layers comprises lower layers to the first set of layers, wherein the second set of layers are based on pre-existing connections in the pre-existing predictive neural network models, and wherein the first set of layers refrain from using pre-existing connections, or using different learning rates in the first set of layers and the second set of layers in the artificial neural network during training, based on a probability of dropout of nodes comprised, respectively, within the first set of layers and the second set of layers in the artificial neural network.

8. The method according to claim 7, wherein the training and testing further comprises training and testing a subset of pre-existing connections in the pre-existing predictive neural network models by initializing the pre-existing connections in the subset with previously learned weights.

9. The method according to claim 1, wherein at least one of the pre-existing predictive neural network models is a deep neural network model.

10. The method according to claim 1, wherein the behavior is churn in a telecommunications network.

11. A computer program, comprising instructions which, when executed on at least one processor, cause the at least one processor to carry out the method according to claim 1.

12. A node configured to manage an artificial neural network, the node being further configured to:

obtain a first pre-existing predictive neural network model of a behavior in a first group of users and a second pre-existing predictive neural network model of a behavior in a second group of users from a database, generate a third predictive neural network model based on merging the first pre-existing predictive neural network model of the behavior in the first group of users with the second pre-existing predictive neural network model of the behavior in the second group of users, wherein to merge is configured to comprise establishing one or more connections between the first pre-existing predictive neural network model and the second pre-existing predictive neural network model, each of the one or more connections being configured to have a respective weight, wherein the respective weights of the one or more connections are configured to be learned by respective connections of neurons in the artificial neural network based on data configured to be obtained from a third group of users, and train the third predictive neural network model of the behavior for predicting the behavior in the third group of users based on the data configured to be obtained from the third group of users, wherein a memory size of the data configured to be obtained from the third group of users is smaller than that on which the first pre-existing predictive neural network model and the second pre-existing predictive neural network model are configured to be based on, by a configurable first threshold.

13. The node according to claim 12, wherein the first threshold is configured to be based on a prediction accuracy of a predictive neural network model of the behavior configured to be solely based on the data configured to be obtained from the third group of users.

14. The node according to claim 12, wherein to merge is further configured to comprise merging the first pre-existing predictive neural network model of the behavior with a plurality of second pre-existing predictive neural network models of the behavior in respective second groups of users, wherein to merge is further configured to comprise establishing the one or more connections between the first pre-existing predictive neural network model and each of the second pre-existing predictive neural network models in the plurality, each of the one or more connections having a respective weight, wherein the respective weights of the one or more connections are configured to have been learned by respective connections of neurons in the artificial neural network based on data configured to be obtained from the third group of users, and wherein the third predictive neural network model of the behavior is configured to be generated based on the pre-existing predictive neural network models configured to be merged, further comprising the plurality of second pre-existing predictive neural network models.

15. The node according to claim 14, wherein obtaining the first pre-existing predictive neural network model of the behavior and the plurality of second pre-existing predictive neural network models of the behavior based on one or more of:

one or more features common to a respective pre-existing predictive neural network model, from the first pre-existing predictive neural network model and the plurality of second pre-existing predictive neural network models, and a learning task configured to be associated with the behavior of the third group of users;

a respective predictive power, based on the one or more features, in the respective pre-existing predictive neural network model;

a degree of similarity between a respective first profile of data corresponding to a respective pre-existing group of users, from the first group of users and the second groups of users, and a respective second profile of the data obtained from the third group of users; and a performance of a respective pre-existing predictive neural network model with the data configured to be obtained from the third group of users.

16. The node according to claim 15, wherein the node is further configured to:

rank the pre-existing predictive neural network models configured to be merged according to a ranking criterion, and the learning task configured to be associated with the behavior of the third group of users, the ranking criterion being configured to be based on one or more of:

the one or more features common to the respective pre-existing predictive neural network model and the learning task associated with the behavior of the third group of users;

the respective predictive power, based on the one or more features, in the respective pre-existing predictive neural network model;

the degree of similarity between the respective first profile of data corresponding to the respective pre-existing group of users, and the respective second profile of the data obtained from the third group of users; and the performance of the respective pre-existing predictive neural network model with the data configured to be obtained from the third group of users.

17. The node according to claim 16, wherein the node is further configured to:

select the pre-existing predictive neural network models to be merged from a pool of pre-existing predictive neural network models, wherein to select is configured to be performed according to a selection criterion, the selection criterion being configured to be based on the ranking criterion and a second threshold.

18. The node according to claim 12, being further configured to:

test the third predictive neural network model of the behavior, wherein to train and test is configured to comprise at least one of:

learning a set of weights of a first set of layers of the artificial neural network, and freezing a second set of layers of the artificial neural network, wherein the second set of layers is configured to comprise lower layers to the first set of layers, wherein the second set of layers are configured to be based on pre-existing connections in the pre-existing predictive neural network models, and wherein the first set of layers are configured to refrain from using pre-existing connections, or using different learning rates in the first set of layers and the second set of layers in the artificial neural network during training, based on a probability of dropout of nodes configured to be comprised, respectively, within the first set of layers and the second set of layers in the artificial neural network.

* * * * *